United States Patent [19]

Watanabe

[11] 3,877,075

[45] Apr. 8, 1975

[54] MAGNETIC TAPE APPARATUS WITH IMPROVED CASSETTE INSERTION AND REMOVAL

[75] Inventor: Kunitake Watanabe, Tokyo, Japan

[73] Assignee: Sony Corporation, Tokyo, Japan

[22] Filed: June 8, 1973

[21] Appl. No.: 368,072

[30] Foreign Application Priority Data

June 17, 1972 Japan .......................... 47-71771[U]

[52] U.S. Cl. .................................... 360/96; 360/105

[51] Int. Cl. ......................... G11b 15/00; G11b 5/54

[58] Field of Search ....... 274/4 E, 4 C, 4 D; 360/96, 360/105

[56] References Cited

UNITED STATES PATENTS

| | | | |
|---|---|---|---|
| 3,432,169 | 3/1969 | Schroder | 274/4 E |
| 3,458,158 | 7/1969 | Ohira | 274/4 E |
| 3,476,392 | 11/1969 | Culbertson et al. | 274/4 E |
| 3,759,529 | 9/1973 | Yoshii | 274/4 E |

*Primary Examiner*—Bernard Konick
*Assistant Examiner*—Stewart Levy
*Attorney, Agent, or Firm*—Lewis H. Eslinger; Alvin Sinderbrand

[57] ABSTRACT

In an apparatus for recording and/or reproducing signals on a magnetic tape in a cassette by means of a head extended through an opening of the cassette housing to engage the tape therein when a head carriage is moved from an inactive position to an active position in respect of the cassette located in an operative position on the apparatus, and in which an ejecting device is operative to remove the cassette from such operative position; there is provided a locking device which is conditioned by operation of the ejecting device to prevent the movement of the head carriage from its inactive position to its active position. In a preferred embodiment, the ejecting device is operable only when the head carriage is in its inactive position, and the locking device is automatically released when a cassette is disposed in the operative position thereof.

14 Claims, 8 Drawing Figures

MAGNETIC TAPE APPARATUS WITH IMPROVED CASSETTE INSERTION AND REMOVAL

BACKGROUND OF THE INVENTION

1. Field of the Invention

This invention relates generally to tape recording and/or reproducing apparatus, and more particularly is directed to improvements in such apparatus of the type intended for use in connection with tape cassettes.

2. Description of the Prior Art

In existing recording and/or reproducing apparatus for use with tape cassettes, reel support shafts for engagement with tape supply and take-up reels within a cassette, a capstan and a motor for driving apparatus, reel shafts and capstan, and which are included in the tape driving mechanism, are mounted on a main chassis, and the magnetic head for selectively recording and/or reproducing signals on the tape as the latter is transported between the supply and takeup reels by means of the tape driving mechanism is mounted on a head plate or carriage which is slidable relative to the main chassis for movement of the head to and from an active position in which the head projects through an opening or window in the cassette housing for engaging the tape therein. In such existing appartus, the cassette may be manually set in its operative position in respect to the chassis, or the cassette may be first placed in a holder which is movable from a cassette receiving position to an operating position at which the cassette in the holder is disposed in its operative position, that is, is located so as to engage its tape supply and takeup reels with the respective reel support shafts and to dispose the tape therebetween for engagement with the magnetic head when the head plate or carriage is moved to its active position. Whether or not a holder is provided for receiving the cassette and transporting the latter to its operative position, the existing apparatus permits a recording or reproducing mode of operation to be selected, for example, by actuation of a respective push-button, even when a cassette is not located in its operative position. In response to the selection of a recording or reproducing mode of operation, the head plate or carriage is moved to its active position in which the magnetic head is located to extend into a window or opening of a cassette housing assuming that the cassette is then disposed in its operative position. However, if a recording or reproducing mode of operation is selected at a time when a cassette is not located in its operative position and, thereafter, the cassette itself or the cassette in a holder is moved to the operative position, then the cassette or the cassette holder will strike against the magnetic head or other elements mounted on the head plate or carriage in its active position and cause damage to the head or such other elements.

SUMMARY OF THE INVENTION

Accordingly, it is an object of the present invention to provide a tape recording and/or reproducing apparatus of the described type in which movement of the head plate or carriage to its active position, as by selection of a recording or reproducing mode of operation, is possible only when a cassette is disposed in its operative position.

Another object is to provide an apparatus, as aforesaid, in which the cassette can be ejected or removed from its operative position only after the head plate or carriage has been returned from its active position to an inactive position in which the magnetic head and other elements on the head plate or carriage are withdrawn from the cassette so as to avoid interference with the ejection or removal of the cassette.

In accordance with an aspect of this invention, a tape recording and/or reproducing apparatus of the described type having ejecting means operative to eject or remove a cassette from its operative position is provided with locking means condition by operation of the ejecting means for holding the head plate or carriage against movement from its inactive position to its active position, and such locking means is thereafter released only when a cassette is again disposed in its operative position.

The above, and other objects, features and advantages of the invention, will be apparent in the following detailed description of illustrative embodiments which is to be read in connection with the accompanying drawings.

DESCRIPTION OF THE PREFERRED EMBODIMENTS

Figure 1:
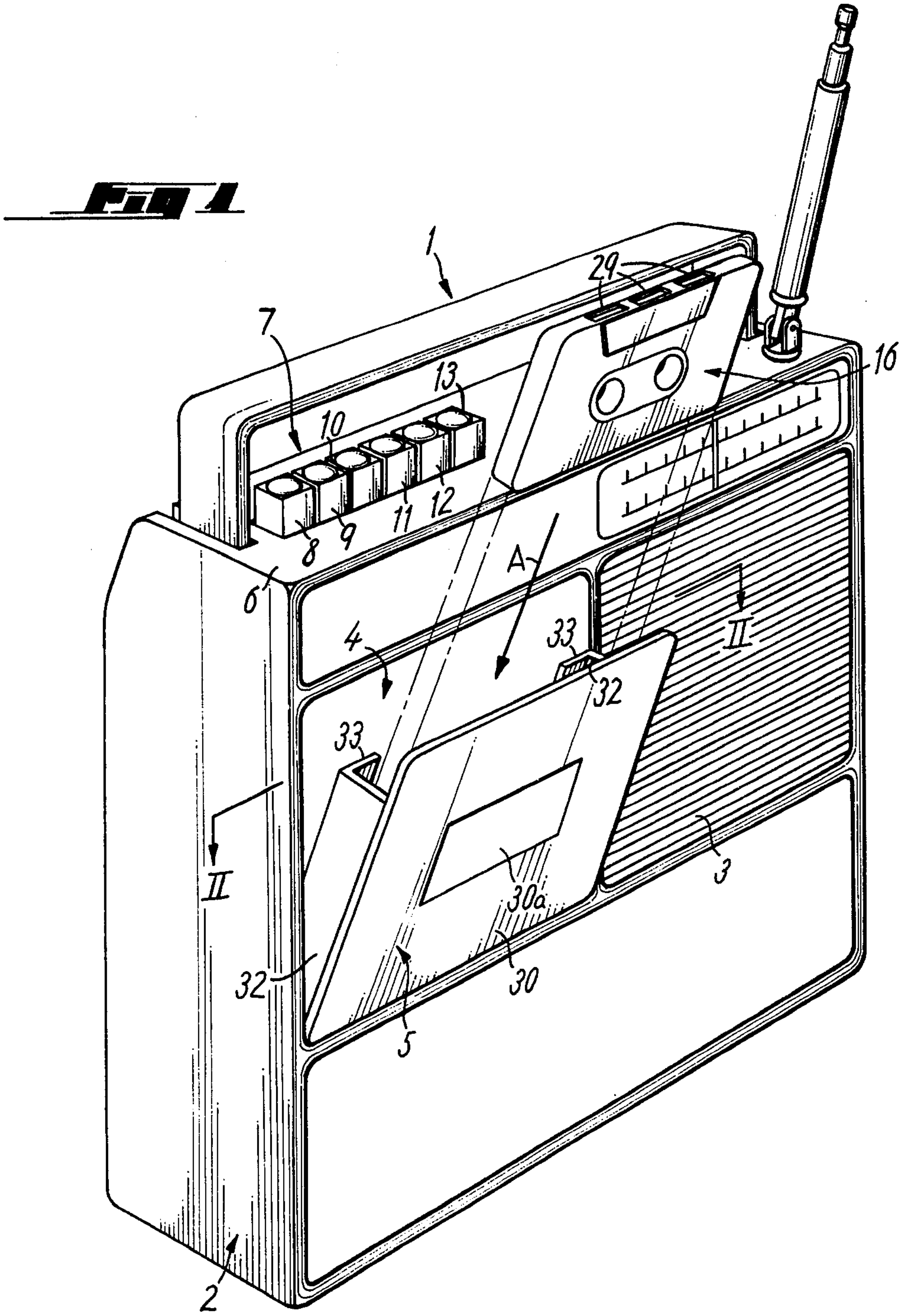
FIG. 1 is a perspective view of a tape recording and/or reproducing apparatus according to this invention shown embodied in a combined radio and cassette tape recorder, and with its cassette holder illustrated in its open or cassette-receiving position.
Figure 2:
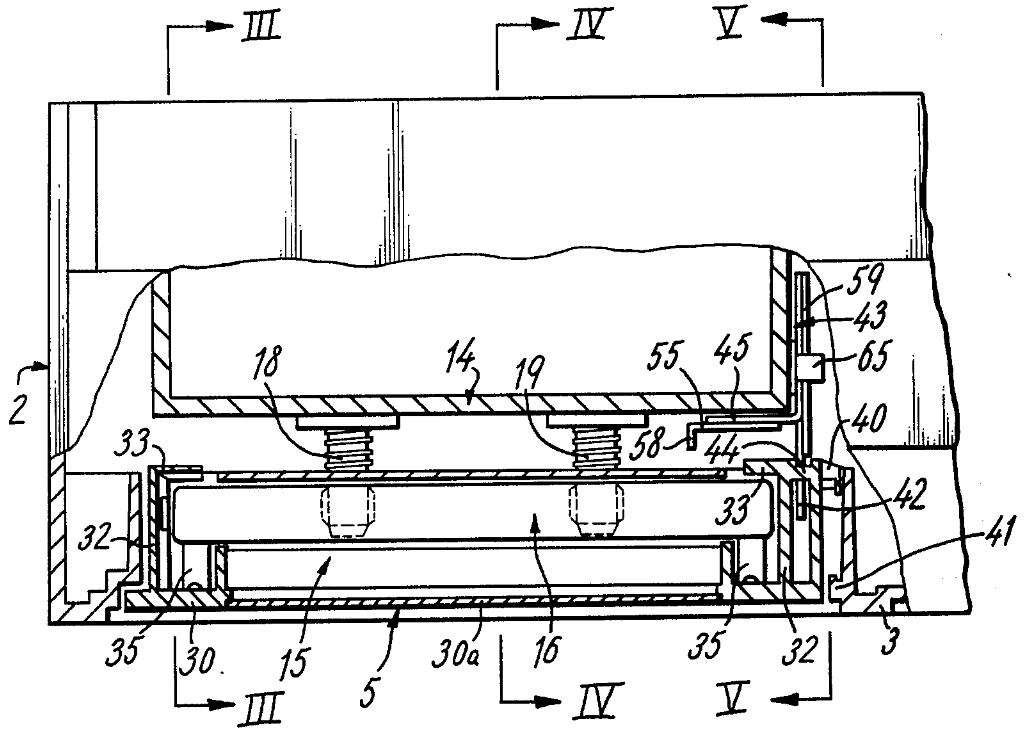
FIG. 2 is an enlarged, horizontal sectional view taken along the line II—II on FIG. 1, but with the cassette holder in its closed or operating position.
Figure 3:
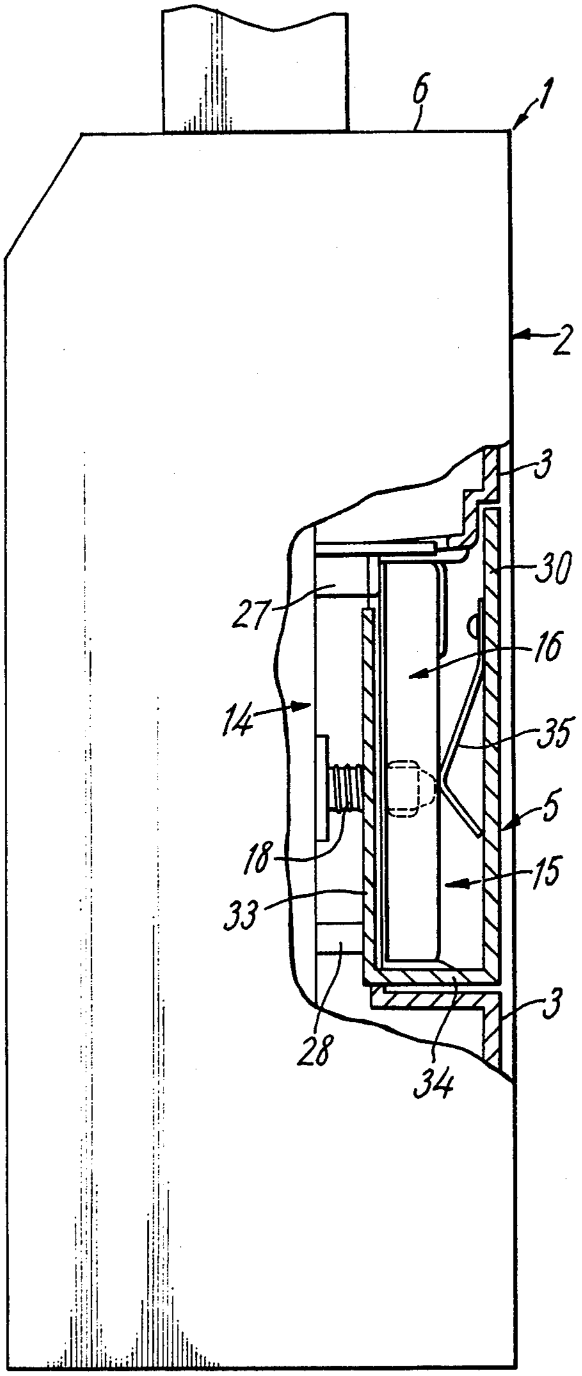
FIGS. 3,4 and 5 are vertical sectional views respectively taken along the lines III—III, IV—IV, and V—V on FIG. 2.
Figure 4:
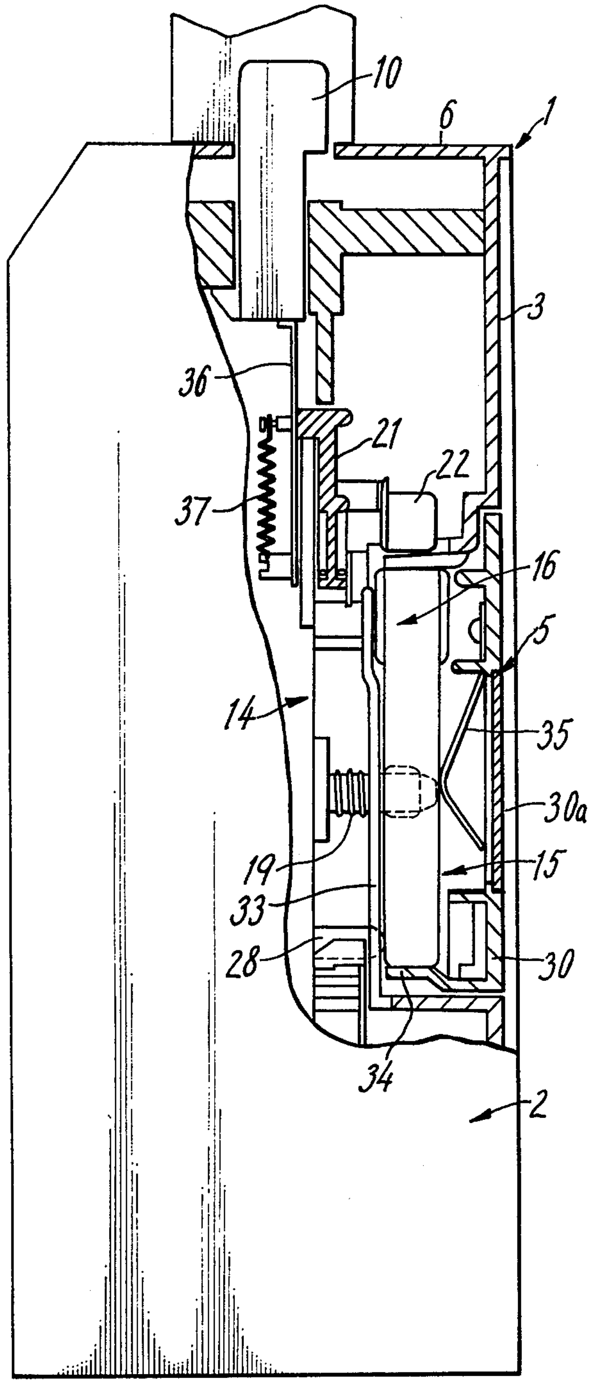
Figure 5:
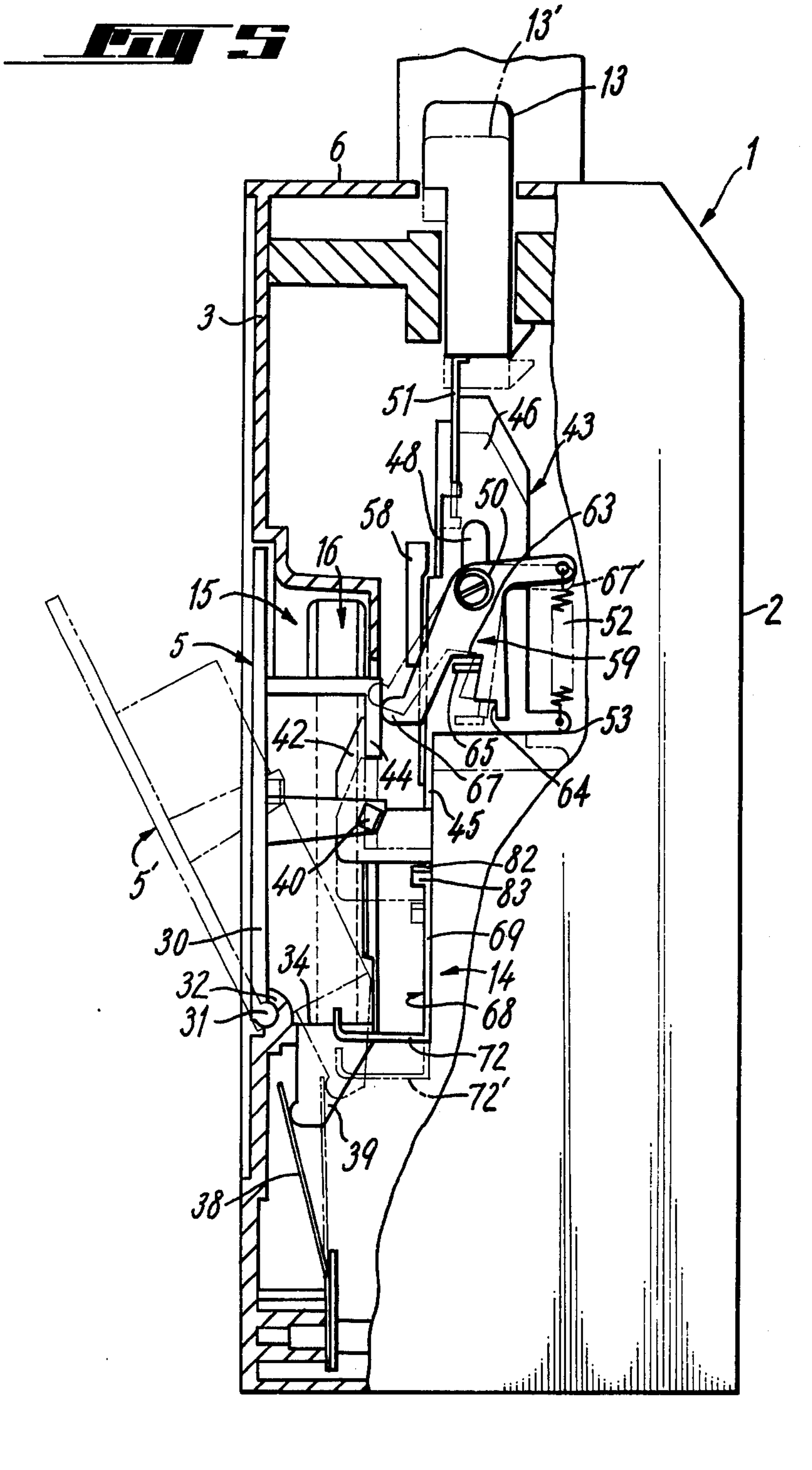

Referring initially to FIG. 1, it will be seen that the illustrated combined radio and tape cassette recorder 1 embodying this invention generally comprises a cabinet 2 including a front panel 3 having an opening 4 therein in which a cassette holder 5 is pivotally mounted for swinging movement between a forwardly inclined open or cassette-receiving position shown in FIG. 1 and broken lines at 5' on FIG. 5 and a closed or operating position shown in FIGS. 2–4 and in full lines on FIG. 5.

The cabinet 2 further has a top panel 6 through which there projects a push-button assembly 7 shown to include six push-buttons 8–13 which, for example, may be provided respectively for initiating the recording, rewinding, playback or reproducing, stopping, fast-forward and ejecting operations of the apparatus.

A main chassis 14 of the tape recording and/or reproducing apparatus according to this invention is suitably secured within cabinet 2 in back of opening 5 so as to leave a space or cavity 15 between chassis 14 and the plane of front panel 3 for accommodating holder 5 with a cassette 16 therein (FIGS. 2–5). Assembled on chassis 14 is a tape driving mechanism which may be of the type disclosed in detail in U.S. Pat. application Ser. No. 233,452, filed Mar. 10, 1972, now U.S. Pat. No. 3,779,498 and having a common assignee herewith. Since the tape driving mechanism per se forms no part of the present invention, it will be neither described or illustrated in detail herein. However, the tape driving mechanism is shown generally to comprise a capstan 17 and reel support shafts 18 and 19 projecting forwardly from chassis 14 and being suitable driven from an electric motor 20 mounted on the chassis (FIG. 6).

Figure 6:
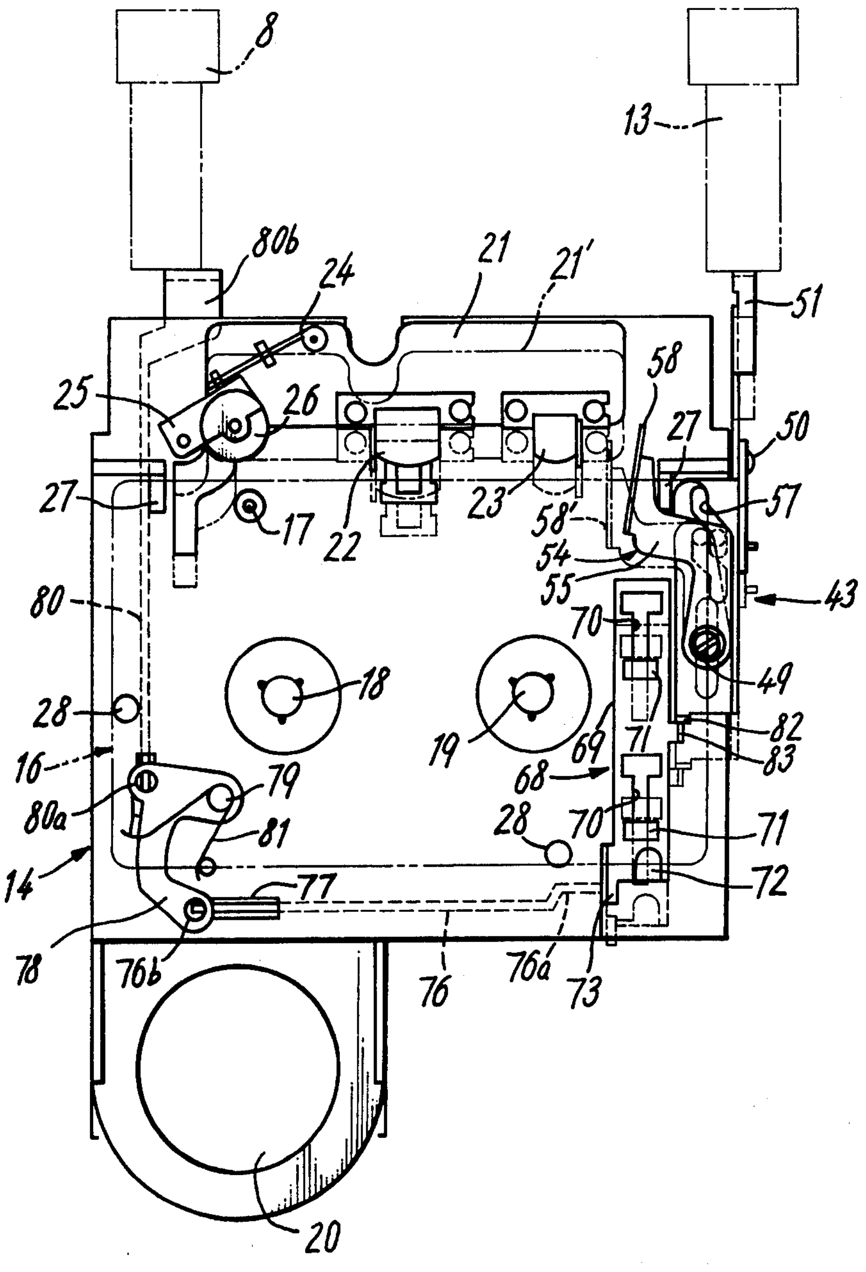
FIG. 6 is a front elevational view of the chassis of the tape recording and/or reproducing apparatus and of the elements mounted thereon in accordance with the present invention.

A head plate carriage 21 is also mounted on chassis 14 so to be slidable relative to the latter between an inactive position shown in full lines on FIG. 6 and an active position indicated in broken lines at 21'. The carriage 21 is shown to have mounted thereon a magnetic head 22 for recording and reproducing signals on a tape within a cassette 16, and an erasing head 23 for erasing previously recorded signals from the tape during a recording operation. The carriage 21 may carry other elements, such as, a spring 24 by which a support arm 25 pivoted on chassis 14 and carrying a rotatable pinch roller 26 is disposed from the position shown on FIG. 6 to an operative position in which pinch roller 26 is urged against capstan 17 in response to the movement of carriage 21 to its active position.

The chassis 14 is further shown to have cassette locating shoulders 27 and posts 28 extending from its front surface for engagement by the cassette 16 so as to precisely locate the latter in its operative position. In such operative position, supply and take-up reels (not shown) with in the cassette are engaged with reel support shafts 18 and 19, and capstan 17 extends into the cassette housing adjacent a run of the tape which extends along a side of the cassette having the usual windows therein, as indicated at 29 on FIG. 1, for permitting the entry of pinch roller 26 and heads 22 and 23 when carriage 21 is displaced to its active position.

As shown particularly on FIG. 5, the cassette holder 5 may include a front wall or lid 30, a portion of which may be transparent as at 30*a* (FIGS. 1,2 and 4), having a bead 31 of circular cross-section extending along the lower edge of lid 30 and being rotatably received in a correspondingly shaped socket 32 formed along the lower edge of opening 4 for pivotally supporting the cassette holder in such opening. Side walls 32 are directed rearwardly from the opposite side portions of lid 30 and terminate in inwardly directed flanges 33 (FIG. 2), and a bottom wall 34 (FIG. 4) extends rearwardly from the lower portion of lid 30 between side walls 32. Thus, when holder 5 is in its open or cassette-receiving position (FIG. 1), a cassette 16 can be slidably inserted downwardly, as indicated by the arrow A, in back of lid 30 until it comes to rest on bottom wall 34 and is contained between side walls 32 and between flanges 33 and lid 30. Springs 35 are provided on the back surface of lid 30 (FIGS. 2–4) to bear rearwardly against the cassette in holder 5 and thereby urge the cassette against locating shoulders and posts 27 and 28 when holder 5 is in its closed or operating position.

In the apparatus to which the present invention is applied, the manual actuation or depression of push-button 8 or push-button 10 for initiating a recording operation or a reproducing or playback operation, respectively, is effective to displace head plate or carriage 21 from its inactive position to its active position indicated in broken lines at 21' on FIG. 6. For example, as shown on FIG. 4 in respect of push-button 10 for initiating a reproducing or playback operation, such push-button may be engageable with an actuating member 36 which is slidably mounted within chassis 14 and coupled with carriage 21 so that, when push-button 10 is depressed to similarly move actuating member 36 downwardly against the force of a spring 37, carriage 21 is moved downwardly to its active position. The push-button 8 for initiating a recording operation may be similarly coupled with carriage 21. As is conventional, the push-button assembly 7 is provided with a locking arrangement (not shown) for locking or retaining each of the push-buttons 8,9,10 and 12 in its depressed position until such time as the push-button 11 is depressed to release the locking arrangement and thereby permit return of the previously depressed push-button to its extended position for stopping the respective, previously selected operation of the apparatus.

If a cassette 16 has been disposed in its operative position against locating shoulders and posts 27 and 28 prior to the actuation of push-button 8 or 10, the movement of carriage 21 to its active position in response to actuation of push-button 8 or 10 is effective to extend heads 22 and 23 and pinch roller 26 into the respective windows or opening 29 of the cassette 16 so as to achieve the desired engagement of those elements with the tape within the cassette. However, it will be apparent that, if carriage 21 is already in its active position at the time when holder 5 is swung into cabinet 2 for moving a cassette 16 to its operative position, heads 22 and 23 and pinch roller 26 will be interposed in the path of cassete 16 and will be struck by the latter or by holder 5 with the possibility that heads 22 and 23 and/or pinch roller 26 will be damaged thereby.

In accordance with the present invention, the foregoing possibility of damage to heads 22 and 23 and/or to pinch roller 26 is avoided by preventing the movement of head plate or carriage 21 from its inactive position to its active position so long as a cassette 16 is not located in its operative position against locating shoulders and posts 27 and 28. More specifically, in the apparatus according to this invention, an ejecting device made operative by actuation of push-button 13 is provided for removing or ejecting cassette 16 from its operative position, as by swinging of holder 5 from its operating position shown in full lines on FIG. 5 to its open or cassette-receiving position indicated in broken lines at 5', and a locking device is conditioned by the operation of such ejecting device for holding head plate or carriage 21 against movement from its inactive position to its active position until a cassette is again disposed at its operative position.

In the illustrated embodiment of the invention, the outward swinging of holder 5 for ejecting a cassette is effected by at least one leaf spring 38 (FIG. 5) which is suitably secured within cabinet 2 below holder 5 and which acts against a respective projection 39 depending from bottom wall 34 of the cassette holder. The outward swinging movement of holder 5 under the influence of spring 38 may be limited by a stop 40 (FIGS. 2 and 5) provided at one side of holder 5 and being engageable with a corresponding keeper 41 formed at the adjacent edge of opening 4 (FIG. 2).

In order to hold or retain cassette holder 5 in its operating or closed position, a latch member 42 is provided on a slide member 43 and is engageable with a keeper 44 which is formed integrally with one of the side walls 32 of holder 5 (FIGS. 2 and 5). As shown particularly on FIG. 7, slide member 43 includes right-angularly related, elongated portions 45 and 46 which are adapted to slidably engage the front surface and a side surface of chassis 14 and which have elongated slots 47 and 48, respectively, therein. Screws 49 and 50 extend through slots 47 and 48, respectively, into tapped holes provided in chassis 14 for guiding slide member 43 in its vertical movement along one side portion of the chassis. The latch member 42 is shown to project forwardly from the lower end of portion 45 of the slide member, while an actuating element 51 extends from the upper end or portion 46 and is engageable by push-button 13 (FIGS. 5 and 6) which is to be depressed for initiating ejecting of a cassette. A spring 52 is connected, at one end, to an arm 53 on slide member portion 46 for urging slide member 43 in the upward direction, whereby to engage its actuating element 51 with the respective push-button 13 and also to engage latch member 42 with keeper 44 on cassette holder 5. It will be apparent that, when push-button 13 is depressed, the corresponding downward movement of slide member 43 against the force of spring 52 releases latch member 42 from keeper 44 and thereby permits spring 38 to swing holder 5 to its opened position for ejecting cassette 16 within the holder from the operative position of the cassette.

Figure 7:
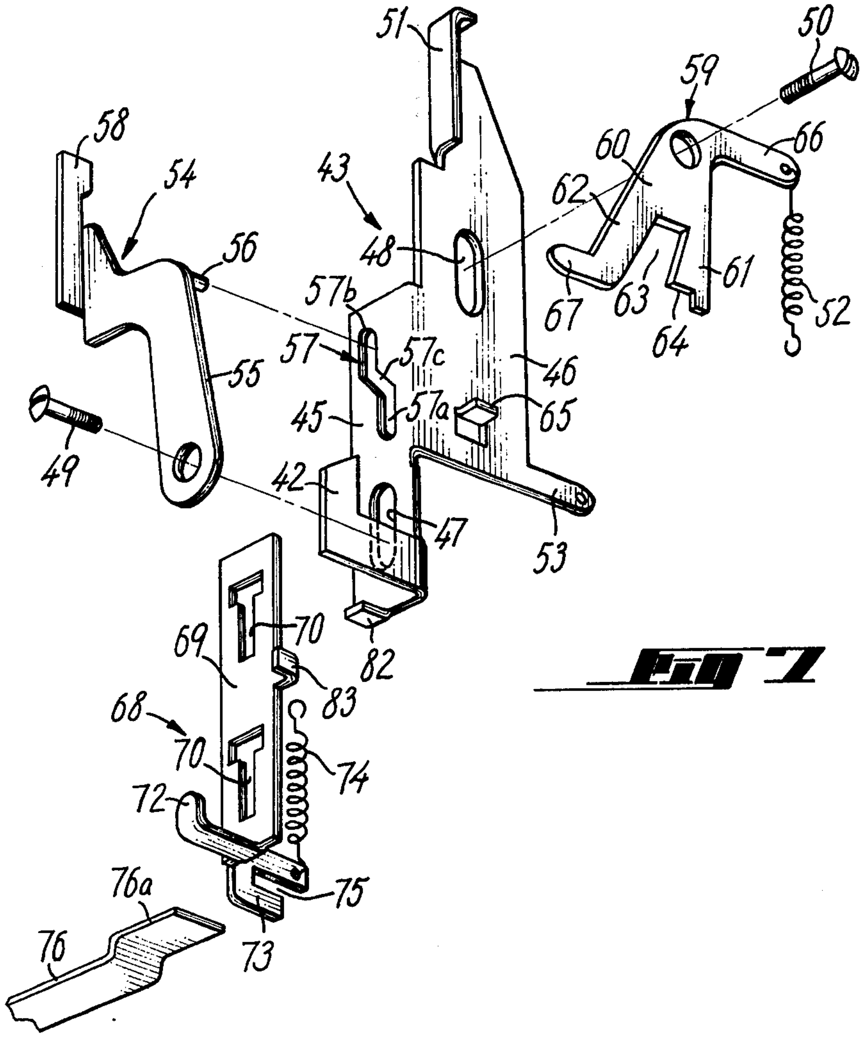
FIG. 7 is an exploded perspective view of the elements mounted on the chassis in accordance with this invention.

In the illustrated embodiment of the invention, the locking device conditioned by the ejecting of a cassette form its operative position for holding carriage 21 against movement from its inactive position to its active position is generally identified by the reference numeral 54 (FIGS. 6 and 7) and is shown to be constituted by an L-shaped arm 55 which is pivotally mounted, at one end, guide screw 49 so as to lie above portion 45 of slide member 43. A guide pin 56 depends from arm 55 and is slidably received in a generally Z-shaped slot 57 formed in slide member portion 45 (FIG. 7). Slot 57 is shown to have laterally offset end portions 57*a* and 57*b* connected by an obliquely extending slot portion 57*c*. *The free end portion of arm 55 terminates in an upstanding flange or abutment 58.*

When the guide pin 56 is disposed in end portion 57*a* of slot 57, that is, when slide member 43 is in its raised or normal position shown in full lines on FIGS. 5 and 6, arm 55 of locking device 54 is displaced laterally toward the adjacent side of chassis 14 to the position shown in full lines on FIG. 6 so that flange or abutment 58 on arm 55 is then located to one side of the path of movement of carriage 21 from its inactive position to its active position indicated at 21'. However, when ejecting push-button 13 is depressed to effect corresponding downward movement of slide member 43 to the lowered position indicated in broken lines on FIGS. 5 and 6, guide pin 56 moves from end portion 57*a* through oblique portion 57*c* to end portion 57*b* of slot 57 with the result that arm 55 is angularly displaced in the counter-clockwise direction, as viewed on FIG. 6, to dispose its flange or abutment 58 in the position indicated in broken lines at 58'. It will be seen that, when in such position 58', the flange or abutment 58 is interposed in the path of movement of carriage 21 from its inactive position to its active position indicated in broken lines at 21'.

In order to retain slide member 43 in its downwardly displaced or lowered position after the manually applied pressure for depressing push-button 13 has been removed from the latter, the apparatus according to this invention includes a retaining member 59 which is pivoted on guide screw 50 so as to lie against portion 46 of slide member 43. Retaining member 59 is shown to include a downwardly directed, bifurcated arm 60 having spaced portions 61 and 62 defining a downwardly opening notch or recess 63 therebetween (FIG. 7). The free end of arm portion 61 is shown to have a notch or cut-out 64 which, when slide member 43 is in its lowered position, is engageable with an abutment or tab 65 struck from slide portion 46 adjacent the lower end of the latter for preventing the upward return of slide member 43 by spring 52. Retaining member 59 is further shown to have an extension 66 extending substantially at right angles to arm 60 and being connected to the end of spring 52 remote from arm 53 on slide member portion 46. Thus, spring 52 performs the dual functions of urging slide member 43 in the upward direction, as mentioned previously, and of urging retaining member 59 to pivot in the clockwise direction as viewed on FIG. 5. The free end of arm portion 62 has a forwardly directed extension 67 which projects forwardly beyond the front surface of chassis 14 so as to be interposed in the path of travel of one of the side flanges 33 of cassette holder 5 when the latter is moved to its closed or operating position.

It will be apparent from the above that, with slide member 43 retained in its lowered position by the engagement of tab 65 in notch 64 of retaining member 59, the releasing extension 67 of arm 60 projects a relatively large distance forwardly from chassis 14, as indicated in broken lines member 67' on FIG. 5. Thus, when cassette holder 5 is swung to its closed or operating position, a side flange 33 of the cassette holder acts on releasing extension 67 to pivot retaining member 59 in the counterclockwise direction, as viewed on FIG. 5, whereby to release tab 54 from notch 64 and to permit the upward movement of the tab 65 within recess 63 in accompaniment with the return of slide memmber 43 to its raised or normal position by the force of spring 52.

The cassette 16 intended to be used with the apparatus according to this invention is of a conventional type having an opening (not shown) in its peripheral wall at the side of the cassette remote from the windows 29 appearing on FIG. 1. Such additional opening in the cassette is initially obstructed by a removable tab (not shown) for indicating, by its presence, that signals recorded on the tape within the cassette in question may be erased and that new signals may be recorded on the tape. However, when such tab is removed from the respective opening, the absence of the tab indicates that signals recorded on the tape within the cassette are to be preserved.

In the apparatus according to this invention intended for use with cassettes of the above described type, a detecting device 68 (FIGS. 5, 6 and 7) is provided for detecting the presence or absence of the removable tab on a cassette disposed in its operative position, and for permitting a recording operation initiated by actuation or depressing of push-button 8 only when the pressure of the tab is detected.

In the illustrated embodiment, the detecting device 68 is shown to include an elongated slide 69 having spaced apart longitudinal slots 70 which slidably receive guide lugs 71 (FIG. 6) projecting from the forward surface of chassis 14. Guide lugs 71 are located (FIG. 6) so that slide 69 is guided for vertical movement alongside portion 45 of slide member 43. A detecting finger 72 extends forwardly and then upwardly from the lower end of slide 69 and is dimensioned and located to engage the peripheral wall of the cassette 16 at the location of the previously mentioned opening therein when the cassette is disposed in its operative position (FIG. 5). A flange 73 (FIG. 7) extends rearwardly from the lower end of slide 69 and is connected to a spring 74 within chassis 14 for urging slide 69 in the upward direction, that is, in the direction for causing finger 72 to enter the previously mentioned opening in cassette 16 in the event that such opening is not obstructed by the removable cassette tab. The flange 73 on slide 69 is formed with a cutout or recess 75 (FIG. 7) which, when slide 69 is displaced downwardly, for example, by the engagement of detecting finger 72 with a tab obstructing the cassette opening, is aligned with the adjacent end 76*a* of a rod 76. As shown on FIG. 6, rod 76 is slidable laterally within chassis 14 along the lower margin of the latter and has its opposite end formed with an upstanding lug 76*b* which projects forwardly through a slot 77 in the chassis. Lug 76*b* is pivotally received in a corresponding hole of a bell-crank 78 which is mounted on a pivot 79 carried by chassis 14. Bellcrank 78 further has a hole receiving a lug 80*a* which extends forwardly through a slot in chassis 14 from the lower end of a push-rod 80 which is vertically slidable within chassis 14 at the side of the latter adjacent the push-button 8 for selecting a recording operation. The upper end portion of push-rod 80 terminates in an actuating portion 80*b* engageable by push-button 8. A hair spring 81 is engaged with bell crank 78 to urge the latter in the clockwise direction about a pivot 79, as viewed on FIG. 6, thereby to maintain the actuating end portion 80*b* of push-rod 80 in engagement with push-button 8, further to withdraw end portion 76*a* of rod 76 from the path of movement of flange 73 on slide 69.

When slide 69 is in its raised position shown in full lines on FIG. 5, for example, when the opening of cassette 16 in its operative position is not obstructed by a tab so that finger 72 can enter such opening, the solid portion of flange 73 is aligned with end 76*a* of rod 76 and thus blocks movement of rod 76 toward the right, as viewed on FIG. 6. With the movement of rod 76 being blocked, as aforesaid, pushrod 80 cannot move downwardly and, therefor, its upper end portion 80*b* prevents depressing of push-button 8 for initiating a recording operation. On the other hand, when slide 69 is moved downwardly, as by the presence of a tab blocking the opening of the cassette, recess 75 of flange 73 is aligned with end 76*a* of rod 76 so that the rod end 76*a* can move toward the right, as viewed on FIG. 6, through recess 75. Thus, in the last mentioned case, when push-button 8 is depressed to initiate a recording operation, the corresponding downward movement of push-rod 80 and rocking of bell crank 78 causes movement of rod 76 toward the right with its end 76*a* extending through notch or recess 75.

It will be apparent that, when a cassette 16 is not present in its operative position, spring 74 tends to urge slide 69 to its raised position shown in full lines on FIG. 5, in which position finger 72 at the lower end of the slide can interfere with the movement of a cassette in holder 5 to its operative position. Similarly, if slide 69 has been in its raised position with a cassette 16 in its operative position, that is, if the detecting device has detected the absence of the tab cassette 16, the engagement of finger 72 in the cassette opening can interfere with the movement of the cassette away from its operative position in response to the movement of the cassette holder to its open position indicated at 5' on FIG. 5. In order to avoid the foregoing problems, in the detecting device 68 according to this invention, a lug 82 at the lower end of portion 45 of slide member 43 is engageable downwardly against a lug 83 extending from the adjacent side edge of slide 69. Thus, when slide member 43 is moved downwardly in response to the actuation of push-button 13 for ejecting a cassette from its operative position, as previously described, the cooperative engagement of lugs 82 and 83 causes similar downward movement of slide 69 for moving the finger 72 thereon to the lowered position shown in broken lines at 72' on FIG. 5. The detecting finger, when in such lowered position indicated at 72', is spaced downwardly from cassette 16 so as to avoid any interference with movement of the cassette to and from its operative condition. Of course, when slide member 43 returns to its normal or raised position, lug 82 thereon moves away from lug 83 on slide 69 so that the position of the latter is thereafter determined by the presence or absence of a tab on a cassette 16 in the operative position.

The apparatus according to this invention described above with reference to FIGS. 1–7 operates as follows:

Assuming initially that a cassette has been ejected from its operative position by actuation of push-button 13, then slide member 43 is thereafter retained in its lowered position by retaining member 59. With slide member 43 retained in its lowered position, flange 58 of locking arm 55 is at the position indicated in broken lines at 58' on FIG. 6 and thereby blocks movement of head plate or carriage 21 to its active position 21', as by actuation of push-button 8 or push-button 10 for initiating a recording operation or a reproducing operation, respectively. Further, with slide member 43 retained in its lowered position, slide 69 is similarly retained in its lowered position, by the coaction of lugs 82 and 83, with detecting finger 72 being thereby displaced downwardly from the path of movement of a cassette to and from its operative position.

When a cassette 16 is inserted in holder 5 in the open position 5' of the latter, and holder 5 is pivoted to its closed position, neither the heads 22 and 23 or pinch roller 26 nor detecting finger 72 can interfere with the movement of the cassette to its operative position. As cassette 16 arrives at its operative position against locating shoulders 27 and posts 28, holder 5 acts upon releasing extension 67 of retaining member 59 so as to release tab 65 on slide 43 from notch 64 with the result that spring 52 returns slide member 43 to its raised position shown in full lines on FIG. 5. The movement of slide member 43 to its raised position causes latch 42 to engage keeper 44 of cassette holder 5 for latching the latter in its closed position. The upward movement of slide member 43 further causes pivoting of locking arm 55 to the position shown in full lines on FIG. 6 where its flange or abutment 58 is disposed to one side of the path of movement of head plate or carriage 21 from its inactive position to its active position. The upward movement of slide member 43 still further moves lug 82 away from lug 83 and thereby frees slide 69 to detect the presence or absence of a tab on cassette 16 in its operative position. If a tab is present on the cassette, the position of slide 69 aligns recess 75 of its flange 73 with end 76*a* of rod 76 and thereby permits push-button 8 to be depressed for initiating a recording operation during which head plate 21 is moved to its active position 21′ for engaging heads 22 and 23 and pinch roller 26 with the tape in cassette 16. If the tab is absent from cassette 16 for indicating that the signals recorded on the tape are to be preserved, then the resultant positioning of slide 69 causes its flange 73 to block movement of rod 76 and thereby prevent the initiation of a recording operation by depressing of push-button 8. In this condition, the movement of head plate or carriage 21 to its active position 21′ can be effected only by actuation of push-button 10 for initiating a playback or reproducing operation.

It will be seen that, so long as the head plate or carriage is in its active position indicated at 21′ on FIG. 6, that is, during a recording or reproducing operation, the side of head plate 21 adjacent flange or abutment 58 on locking arm 55 blocks the return of that flange or abutment 58 to the position indicated in broken lines at 58′. Thus, by reason of the engagement of guide pin 56 on arm 55 in Z-shaped slot 57 of slide member 43, downward movement of slide member 43 for ejecting a cassette is prevented during a recording or reproducing operation so that there is no danger that cassette 16 will be moved away from its operative position at a time when heads 22 and 23 and pinch roller 26 are extended into windows 29 of the cassette.

When a recording or reproducing operation is terminated, for example, by actuation of the "stop" push-button 11, so that head plate or carriage 21 is returned to its inactive position shown in full lines on FIG. 6 and heads 22 and 23 and pinch roller 26 are withdrawn upwardly from the windows 29 of cassette 16, the side of carriage 21 adjacent flange or abutment 58 no longer blocks the movement of the latter to the position indicated in broken lines at 58′. Thus, push-button 13 can then be actuated or depressed for moving slide member 43 downwardly to its lowered position. During such downward movement of slide member 43, locking arm 55 is angularly displaced to dispose its flange or abutment in the position 58′, and latch member 42 is released from keeper 44 on cassette holder 5 to permit spring 38 to return the cassette holder to its open position indicated in broken lines at 5′ on FIG. 5. Further, the downward movement of slide member 43 is effective, by the engagement of lugs 82 and 83, to cause corresponding downward movement of slide 69 for removing detecting finger 72 from the path of movement of the cassette away from its operative position. Thereafter, retaining member 59 retains slide member 43 in its lowered position so that flange or abutment 58 on locking arm 55 remains in its position 58′ on FIG. 6 for blocking the movement of head plate or carriage 21 from its inactive position to its active position.

Figure 8:
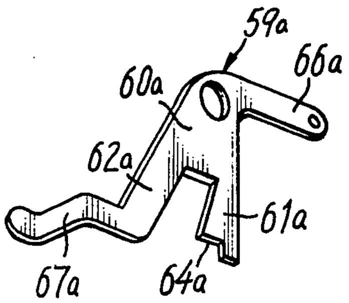
FIG. 8 is a perspective view of a modification of one of the elements shown in FIG. 7.

In the embodiment of the present invention described above with reference to FIGS. 1–7, the releasing extension 67 on retaining member 59 is dimensioned and positioned so as to be engageable by an adjacent side flange 33 of the cassette holder 5 when the latter is moved to its closed or operating position for disposing a cassette 16 in its operative position. However, if desired, the retaining member 59 may be arranged to be actuated by the cassette 16 itself upon reaching its operative position. Thus, for example, as shown on FIG. 8, a retaining member 59*a*, which is otherwise identical with the previously described retaining member 59 and has its several parts identified by the same reference numerals, but with the letter *a* appended thereto, is provided with a laterally offset releasing extension 67*a* of its arm portion 62*a*. Such laterally offset releasing extension 67*a* is dimensioned and located so as to be engageable by the cassette 16 itself when the latter is disposed in its operative position against locating shoulders 27 and post 28 on chassis 14. An apparatus according to this invention provided with the retaining member 59*a* of FIG. 8 operates in the same manner as has been described above with reference to FIGS. 1–7.

It will be seen that, in the tape recording and/or reproducing apparatus embodying this invention, movement of the head plate or carriage to its active position, as by selection of a recording or reproducing mode of operation, is possible only when a cassette is disposed in its operative position, and further that the cassette can be ejected or removed from its operative position only after the head plate or carriage has been returned from its active position to an inactive position in which the magnetic head or heads and pinch roller are withdrawn from the cassette for avoiding interference with the ejection or removal of the cassette.

Although illustrative embodiments of the invention have been described in detail herein with reference to the accompanying drawings, it is to be understood that the invention is not limited to those precise embodiments, and that various changes and modifications may be made therein by one skilled in the art without departing from the scope or spirit of the invention as defined in the appended claims.

What is claimed is:

1. An apparatus for recording and/or reproducing signals on a magnetic tape in a cassette having an opening to expose the tape therein, said apparatus comprising: a chassis having movable receptacle means thereon for receiving a cassette and moving said cassette into and out of an operative position; a carriage carrying at least one magnetic head and being slidable on said chassis for movement between an active position, in which said head extends into said opening of a cassette in said operative position, and an inactive position, in which said head is withdrawn from the path of movement of said cassette to permit movement of a cassette to and from said operative position; actuating means connected to said carriage to move said carriage from said inactive position to said active position and from said active position to said inactive position, selectively; ejecting means separate from said actuating means and operative, when actuated, to move a cassette out of said operative position, said ejecting means being movable into and out of an actuated position; and locking means coupled to said ejecting means to be moved thereby into the path of said carriage only when said carriage is in said inactive position for holding said carriage against movement from said inactive position to said active position when said ejecting means is in said actuated position, said locking means engaging said carriage and restraining said ejecting means from moving into said actuated position when said carriage is in said active position.

2. An apparatus as in claim 1 further comprising feeler means responsive to the presence of said carriage in said active position and coupled to said ejecting means for preventing operation of said ejecting means when said carriage is in said active position.

3. An apparatus as in claim 2 in which said means for receiving a cassette comprises a holder movable between a cassette-receiving position and a second position in which a cassette in said holder is in said operative position, said apparatus further comprising trigger means coupled to said ejecting means to hold said ejecting means in its actuated condition when said holder is in said cassette-receiving position and to release said ejecting means for releasing said locking means when said holder is disposed in said second position.

4. An apparatus as in claim 3 further comprising latching means for latching said holder in said second position and which is released in response to actuation of the ejecting means.

5. An apparatus as in claim 1 further comprising trigger means responsive to a cassette in said operative position and coupled to said locking means for releasing said locking means when a cassette is disposed in said operative position.

6. An apparatus as in claim 1 further comprising means for holding a cassette in said operative position and which is released in response to said operation of the ejecting means.

7. An apparatus as in claim 1 further comprising a cassette holder movable relative to said chassis from a cassette-receiving position to an operating position for disposing a cassette therein in said operative position of the cassette; and latch means for retaining said holder at said operating position, said ejecting means including means for urging said holder to return to said cassette-receiving position and selectively actuable means for releasing said latch means.

8. An apparatus according to claim 7 in which said selectively actuable means includes a slide member having said latch means connected therewith and being movable on said chassis in one direction for releasing said latch means and in the opposite direction for engaging said latch means, and spring means urging said slide member in said opposite direction; and in which said locking means includes a movable locking arm coupled with said slide member and extending into the path of movement of said head carriage from said inactive position to said active position in response to movement of said slide member in said one direction.

9. An apparatus according to claim 8 in which said locking arm and slide member are coupled together by a slidable pin-and-slot connection which moves said locking arm to one side of the path of movement of said head carriage in response to the movement of said slide member in said opposite direction so that, when said head carriage is thereafter moved to its active position, said locking arm is engageable against the adjacent side of said head carriage to prevent the movement of said slide member in said one direction and the consequent releasing of said latch means.

10. An apparatus according to claim 8 further comprising retaining means engageable with said slide member upon movement of the latter in said one direction to permit the return thereof in said opposite direction when a cassette is again disposed in said operative position thereof.

11. An apparatus according to claim 10 in which said retaining means extends into the path of movement of said holder to be displaced by said holder during movement of the latter to said operating position for disengagement of said retaining means from said slide member.

12. An apparatus according to claim 10 in which said retaining means extends into the path of movement of a cassette to be displaced by a cassette during movement of the latter to said operative position of the cassette for disengagement of said retaining means from said slide member.

13. An apparatus according to claim 1 in which the cassette has a port with a removable tab initially extending in said port for indicating, by its presence, that recording of signals on the tape is permitted, said apparatus further comprising: selectively actuable means for initiating recording and reproducing modes of operation of the apparatus; a detecting member movable on said chassis between first and second positions and being yieldably urged to said first position, said detecting member having a finger extending therefrom so as to be engageable, in said first position, in said port of the cassette when the latter is located in said operative position and said detecting member being moved to said second position by the engagement of said tab with said finger in the event that said tab is present in said port; means for preventing the selection of said recording mode of operation in response to the disposition of said detecting member in said first position thereof; and means connecting said detecting member to said ejecting means for displacing said detecting member to said second position when said ejecting means is actuated, thereby to avoid interference by said finger with movement of a cassette to and from said operative position of the latter.

14. An apparatus as in claim 13 in which said ejecting means includes a slide member movable on said chassis in one direction for said operation of the ejecting means, spring means urging said slide member in the opposite direction, and retaining means engageable with said slide member upon movement of the latter in said one direction for preventing the return thereof in said opposite direction until a cassette is again disposed in said operative position thereof; and in which said means for displacing said detecting member to said second position thereof includes cooperatively engageable elements on said slide member and detecting member, respectively, for displacing said detecting member to said second position thereof in response to movement of said slide member in said one direction and for permitting the return of said detecting member to said first position upon return of said slide member in said opposite direction.

* * * * *